United States Patent
Miyoshi et al.

(10) Patent No.: US 7,495,858 B2
(45) Date of Patent: Feb. 24, 2009

(54) INFORMATION PROCESSING APPARATUS HAVING BUILT-IN HARD DISK DRIVE AND HEAD RETRACTION PROCESSING METHOD OF BUILT-IN HARD DISK DRIVE

(75) Inventors: Naoki Miyoshi, Tokyo (JP); Keisuke Koide, Tokyo (JP)

(73) Assignee: Sony Corporation (JP)

( * ) Notice: Subject to any disclaimer, the term of this patent is extended or adjusted under 35 U.S.C. 154(b) by 24 days.

(21) Appl. No.: 11/643,625

(22) Filed: Dec. 21, 2006

(65) Prior Publication Data

US 2007/0177295 A1    Aug. 2, 2007

(30) Foreign Application Priority Data

Dec. 28, 2005  (JP) ............................ P2005-377826
Dec. 28, 2005  (JP) ............................ P2005-377922

(51) Int. Cl.
  *G11B 21/02*    (2006.01)
  *G11B 33/14*    (2006.01)
(52) U.S. Cl. .................... 360/75; 360/69; 360/97.02
(58) Field of Classification Search ................. None
  See application file for complete search history.

(56) References Cited

U.S. PATENT DOCUMENTS

| | | | | |
|---|---|---|---|---|
| 5,982,573 A | * | 11/1999 | Henze | 360/75 |
| 6,738,214 B2 | * | 5/2004 | Ishiyama et al. | 360/75 |
| 2005/0141127 A1 | * | 6/2005 | Shimotono et al. | 360/75 |

FOREIGN PATENT DOCUMENTS

| | | | |
|---|---|---|---|
| JP | 2000241442 A | * | 9/2000 |
| JP | 2005-346840 A | | 12/2005 |

* cited by examiner

*Primary Examiner*—Jason C Olson
(74) *Attorney, Agent, or Firm*—Lerner, David, Littenberg, Krumholz & Mentlik, LLP

(57) ABSTRACT

An information processing apparatus includes a hard disk drive, an acceleration sensor, and a determination section. The hard disk drive is capable of moving a head of the hard disk drive to a data-free landing zone. The acceleration sensor detects acceleration. The determination section obtains a low frequency component from the detected acceleration and determines whether it is necessary to move the head of the hard disk drive to the data-free landing zone based on the low frequency component.

29 Claims, 12 Drawing Sheets

INFORMATION PROCESSING APPARATUS HAVING BUILT-IN HARD DISK DRIVE AND HEAD RETRACTION PROCESSING METHOD OF BUILT-IN HARD DISK DRIVE

CROSS-REFERENCE TO RELATED APPLICATIONS

The present application claims priority from Japanese Patent Application Nos. JP 2005-377922 filed on Dec. 28, 2005 and 2005-377826 filed on Dec. 28, 2005, the disclosures of which are hereby incorporated by reference herein.

BACKGROUND OF THE INVENTION

1. Field of the Invention

The present invention relates to an information processing apparatus having a built-in hard disk drive and a head retraction processing method of the built-in hard disk drive.

2. Description of the Related Art

In a portable device such as a note-type PC, it is an important problem to be solved to protect the device against shock in cases like the device is mistakenly dropped or the shock is applied from the outside when the device is carried by hand or being in use. In particular, in a magnetic disk drive such as a hard disk drive (HDD) used as a recording device, a magnetic head reads and writes data from and to a rotating magnetic disk. Thus, when the magnetic head collides with the magnetic disk due to shock or vibration applied to the device, the magnetic disk may be damaged and data recorded thereon may be destroyed. Although an acceleration sensor may be built into the HDD, in many cases, the HDD is merely designed to stop writing data on the disk temporarily and even if the head is being retracted, the operation of the head may not be controlled precisely.

To solve this problem, an acceleration sensor or the like may be built into the device and when the acceleration or its change amount that the acceleration sensor detects exceeds predetermined level, the magnetic head is retracted to a data-free landing zone.

In a related art of this kind, a system that stops writing data to the record medium temporarily when the HDD is subjected to shock or vibration may be adopted. When the HDD stops writing data to the record medium, data may be prevented from being written to an incorrect address, however, since the head is placed above the medium, the head may contact the medium, when the head is subjected to strong shock or vibration. As a result, there is a possibility that the head being damaged.

To solve such a problem, in a related art of such kind, a sensor such as an acceleration sensor may be used to detect shock or vibration applied to the HDD. When the sensor detects shock or vibration, the HDD retracts the head to the data-free landing zone. For example, according to Japanese Patent Application Laid-Open publication No. 2005-346840 the falling state of the device is detected based on acceleration for the X axis, Y axis, and Z axis and when the state is detected, the head of the HDD is retracted to the data-free landing zone.

However, the acceleration sensor is a device that detects acceleration, namely a change of speeds per unit time. Thus, if a shock/vibration determination process is performed on the basis of only the levels of acceleration information obtained from the sensor, the magnetic head may be unnecessarily retracted, which leads to decrease of user-friendliness. For example, if the head is retracted while music data or video data are being reproduced from the HDD, video or sound may be temporarily stopped. Alternatively, vibration caused by pressing a key of a build-in keyboard of the device or shock caused by closing a lid that has a display section and that can be opened and closed from and to the main body of the device may result in unnecessarily retracting the magnetic head and thereby decreasing user-friendliness.

Generally, the acceleration sensor is a device that provides acceleration information. Thus, it is necessary to use a dedicated shock/vibration processing section that is used to determine whether or not the HDD is subjected to shock or vibration. To implement this section, by for example a PC, a program (driver) that operates on an operating system (OS) or a dedicated LSI may be provided.

However, when the shock/vibration determination is performed with the program (driver) that operates on the OS, due to characteristics of the PC, resources of the CPU are inevitably used. It is necessary to perform the shock/vibration determination in real time. Thus, the CPU use rate increases and, as a result, the power consumption of the device increases. For the note-type PC, it is important to decrease the power consumption thereof as much as possible to prolong the battery life, therefore, an increase in power consumption is a serious problem.

In contrast, when the dedicated LSI is build-into the device, not only the power for the LSI, but the area for the LSI and a peripheral circuit are necessitated, which leads to a larger circuit scale and increase in cost.

SUMMARY OF THE INVENTION

In view of the foregoing, it would be desirable to provide an information processing apparatus having a built-in hard disk drive and a head retraction processing method of a built-in hard disk drive that are capable of properly determining whether or not there is a necessity of performing a head retraction process of the built-in hard disk drive based on acceleration information. In addition, it would be desirable to provide an information processing apparatus having a built-in hard disk drive and a head retraction processing method of a built-in hard disk drive that are capable of decreasing the likelihood of unnecessarily performing the head retraction process for a built-in hard disk drive, for example, due to vibration caused by pressing a key of a built-in keyboard or shock caused by closing a lid of the device to improve user-friendliness and that are capable of decreasing the risk of contacting the head and a disk surface of the hard disk drive due to vibration or shock caused by movement of closing the lid and carrying the device.

According to an embodiment of the present invention, there is provided an information processing apparatus. The information processing apparatus includes a hard disk drive, an acceleration sensor, and a determination section. The hard disk drive is capable of moving a head to a data-free landing zone. The acceleration sensor detects acceleration. The determination section obtains a low frequency component from the detected acceleration and determines whether it is necessary to move the head of the hard disk drive to the data-free landing zone based on the low frequency component.

According to an embodiment of the present invention, there is provided a head retraction processing method of a hard disk drive in an information processing apparatus having an acceleration sensor. In the head retraction processing method, acceleration is detected with the acceleration sensor. A low frequency component is obtained from the detected acceleration. It is determined whether it is necessary to move a head of the hard disk drive to a data-free landing zone based on the low frequency component.

According to an embodiment of the present invention, there is provided an information processing apparatus. The information processing apparatus includes a hard disk drive, an acceleration sensor, a determination section, a keyboard, and a threshold changing section. The hard disk drive is capable of moving a head to a data-free landing zone. The acceleration sensor detects acceleration. The determination section obtains a high frequency component from the detected acceleration, obtains a vibration level based on the high frequency component, compares the vibration level with a preset threshold value to obtain a comparison result, and determines whether it is necessary to move the head of the hard disk drive to the data-free landing zone based on the comparison result. The keyboard inputs information from a user. The threshold changing section changes the threshold value when an input of the keyboard is detected.

According to an embodiment of the present invention, there is provided an information processing apparatus. The information processing apparatus includes a hard disk drive, an acceleration sensor, a determination section, a lid, a lid open/close detection section, and a threshold value changing section. The hard disk drive is capable of moving a head to a data-free landing zone. The acceleration sensor detects acceleration. The determination section obtains a high frequency component from the detected acceleration, obtains a vibration level based on the high frequency component, compares the vibration level with a preset threshold value to obtain a comparison result, and determines whether it is necessary to move the head of the hard disk drive to the data-free landing zone based on the comparison result. The lid has a display section and is freely capable of being opened and closed relative to a main body of the information processing apparatus. The lid open/close detection section detects an open/close state of the lid. The threshold value changing section changes the threshold value when the lid open/close detection section has detected a close operation of the lid.

According to an embodiment of the present invention, there is provided a head retraction processing method of a hard disk drive in an information processing apparatus having an acceleration sensor. In the head retraction processing method, acceleration is detected with the acceleration sensor. A high frequency component is obtained from the detected acceleration. A vibration level is obtained based on the high frequency component. The vibration level is compared with a preset threshold value to obtain a comparison result. It is determined whether it is necessary to move a head of the hard disk drive to a data-free landing zone based on the comparison result. It is detected whether an input has been made from a user. The threshold value is changed when the input from the user has been detected.

According to an embodiment of the present invention, there is provided a head retraction processing method of a hard disk drive in an information processing apparatus having an acceleration sensor. In the head retraction processing method, acceleration is detected with the acceleration sensor. A high frequency component is obtained from the detected acceleration. A vibration level is obtained based on the high frequency component. The vibration level is compared with a preset threshold value to obtain a comparison result. It is determined whether it is necessary to move a head of the hard disk drive to a data-free landing zone based on the comparison result. It is detected whether a lid closing operation has been performed. The threshold value is changed when the lid closing operation has been performed.

The information processing apparatus having the built-in hard disk drive and the head retraction processing method of the built-in hard disk drive are capable of properly determining whether it is necessary to perform the head retraction process of the built-in hard disk drive based on acceleration information.

The information processing apparatus having the built-in hard disk drive and the head retraction processing method of the built-in hard disk drive are capable of decreasing the likelihood of unnecessarily performing the head retraction process for the built-in hard disk drive, for example, due to vibration caused by pressing a key of the built-in keyboard or shock caused by closing the lid of the device to improve user-friendliness and that are capable of decreasing the risk of contacting the head and the disk surface of the hard disk drive due to vibration or shock caused by closing the lid and carrying the device.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which.

DETAILED DESCRIPTION

Next, with reference to the accompanying drawings, embodiments of the present invention will be described.

Figure 1:
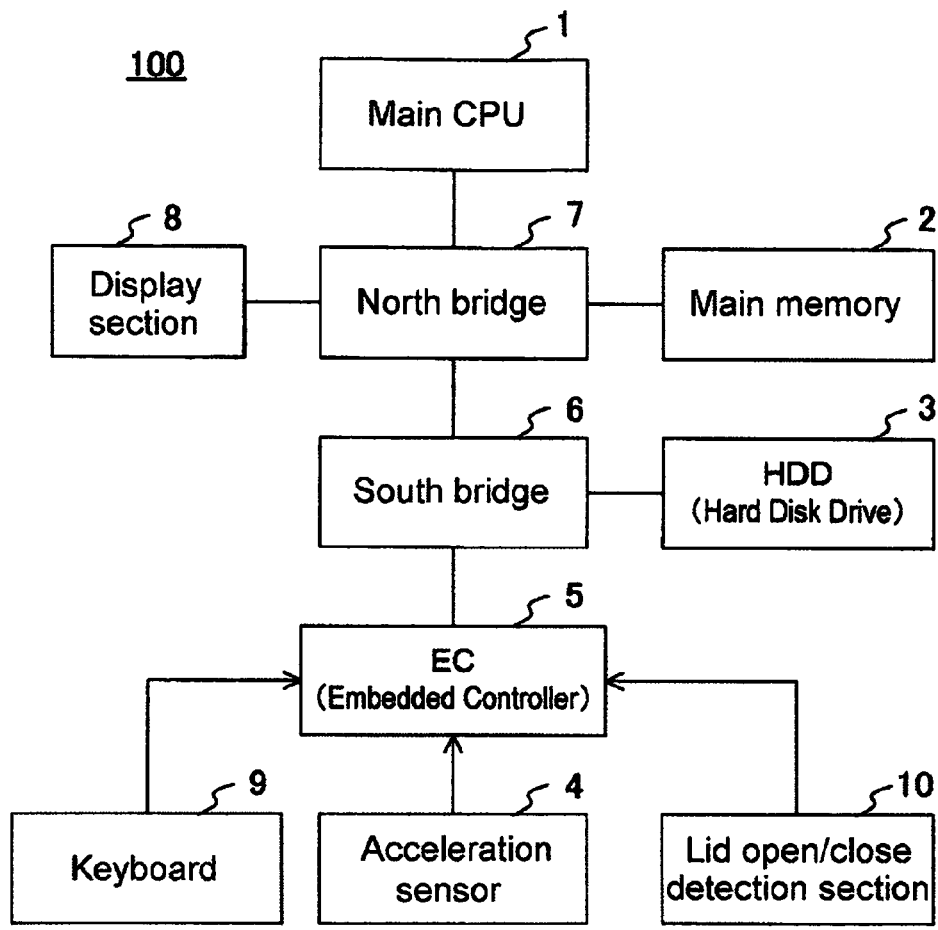
FIG. 1 is a block diagram showing hardware of a note type personal computer (PC) according to an embodiment of the present invention.

FIG. 1 is a block diagram showing hardware of a note-type PC 100 according to an embodiment of the present invention.

The note-type PC 100 includes a main central processing unit (CPU) 1, a main memory 2, a hard disk drive (HDD) 3, an acceleration sensor 4, a embedded controller (EC) 5, a south bridge 6, a north bridge 7, a display section 8, a keyboard 9, and a lid open/close detection section 10. The display section 8 is made up of a liquid crystal display (LCD) disposed on a lid of the note-type PC 100.

The main CPU 1 performs various types of calculation processes for executing an OS, an application program (including utility software 13) that operates on the OS and so forth. The OS and the application program are stored in the main memory 2. The HDD 3 is used as an external storage device for the note-type PC 100. The acceleration sensor 4 is a device that detects acceleration acting on the note-type PC 100 for protecting the HDD 3.

The EC 5 is a device that performs a process for the keyboard 9, a power management defined in Advance Configuration and Power Interface (ACPI), a process for signals supplied from the acceleration sensor 4 and generating acceleration information, and a shock/vibration determination process based on the acceleration information. Hereinafter, these functions of the EC 5 are referred to as the "shock/vibration determination engine" which is denoted by reference numeral 11. Specifically, the EC 5 is large scale integration (LSI) device having a CPU, a read-only memory (ROM), a random access memory (RAM), and so forth. The shock/vibration determination engine 11 is accomplished by software that operates on the CPU.

The south bridge 6 is a circuit that controls information that flows between devices such as the HDD 3, the EC 5, and the north bridge 7. Likewise, the north bridge 7 is a circuit that controls information that flows between devices such as the south bridge 6, the display section 8, the main CPU 1, and the main memory 2. The display section 8 is a device that displays information for a user. The keyboard 9 is a device that processes data that the user inputs. The lid open/close detection section 10 is a device that detects whether or not the lid is open or closed.

Figure 2:
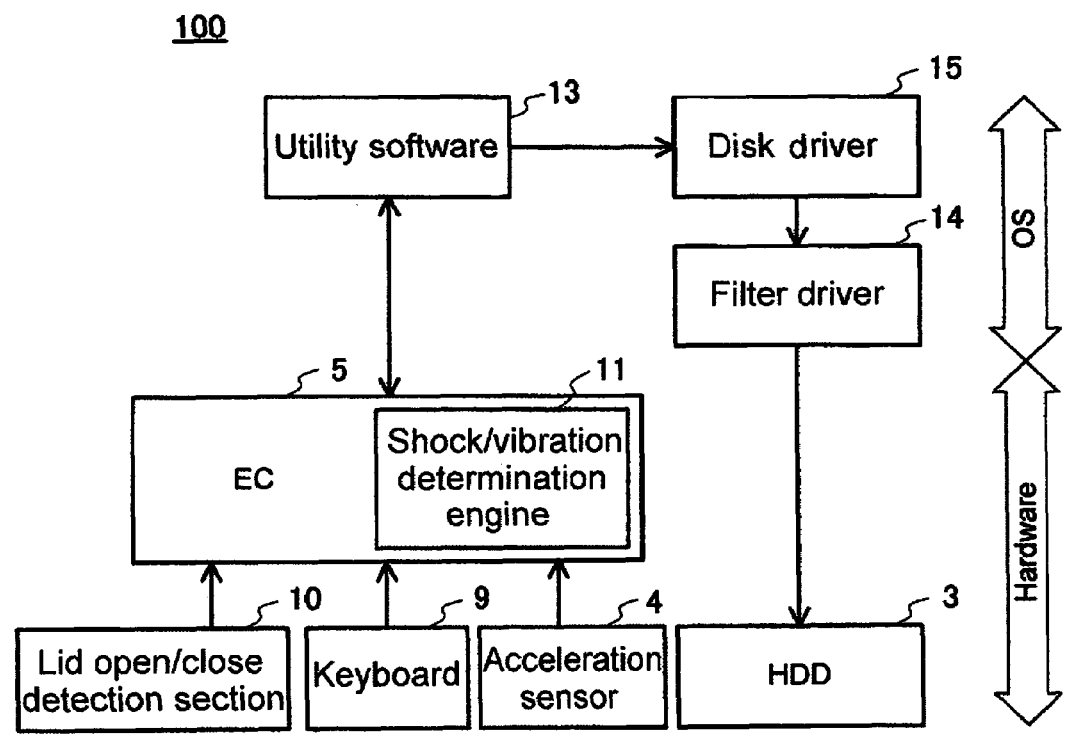
FIG. 2 is a functional block diagram showing the note type PC shown in FIG. 1.

FIG. 2 is a functional block diagram of the note-type PC 100 shown in FIG. 1.

The shock/vibration determination engine 11 of the EC 5 determines whether or not the note-type PC 100 is subjected to shock or vibration based on the acceleration information supplied from the acceleration sensor 4, whether or not there is a necessity to retract a magnetic head of the HDD 3, and switches the sensitivity. The switching of sensitivity takes place when the user switches the sensitivity setting, when a key of the keyboard 9 is pressed, when the lid is being opened or being closed based on the output from the lid open/close detection section 10, and when the lid is at its closing state. The shock/vibration determination engine 11 is not limited to software implemented in the EC 5, but software executed by the main CPU 1.

The acceleration sensor 4 is a sensor that can detect acceleration in the directions of three axes, X axis, Y axis, and Z axis individually. Although a sensor that has a zero-gravity detection mechanism other than the three axis type is available, in this embodiment, a sensor that does not have the zero-gravity detection mechanism is used to reduce the sensor dependability. The acceleration sensor 4 outputs acceleration information in the directions of the three axes as analog signals to the EC 5. Instead, the acceleration sensor 4 may be connected to the EC 5 through a serial communication such as I2CBUS.

Figure 3:
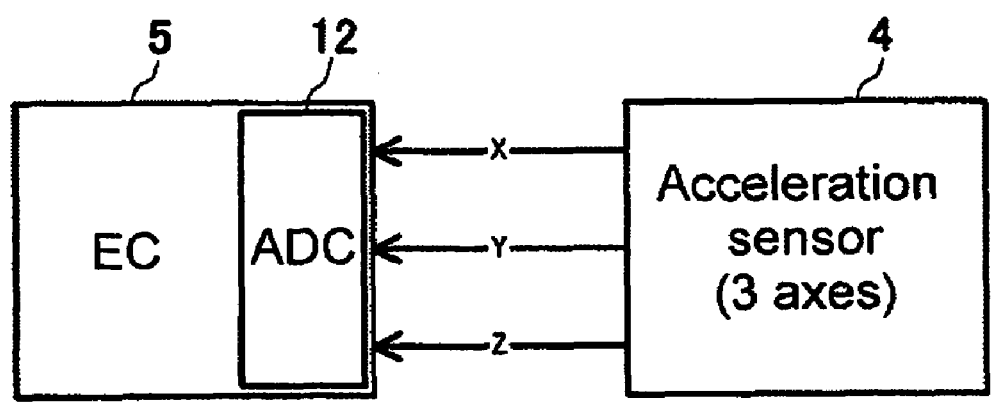
FIG. 3 is a schematic diagram showing connections of an embedded controller (EC) of the note type PC shown in FIG. 1 and an acceleration sensor.

FIG. 3 is a schematic diagram showing connections of the EC 5 and the acceleration sensor 4. As shown in FIG. 3, the EC 5 has an A/C converter (ADC) 12 that converts analog signals for the X axis, Y axis, and Z axis that are output from the acceleration sensor 4 into digital signals.

Returning to FIG. 2, utility software 13 is software that operates on the OS. The utility software 13 issues a head retraction command to the HDD 3 corresponding to a request command supplied from the shock/vibration determination engine 11 of the EC 5. The head retraction command is for example Idle Immediate with Unload command defined in ATA-7 standard. This command causes the HDD 3 to become idle and the magnetic head to be retracted to the data-free landing zone. Instead of the Idle Immediate with Unload command, commands such as Idle command and Standby command that cause the magnetic head to be retracted may be used.

Figure 4:
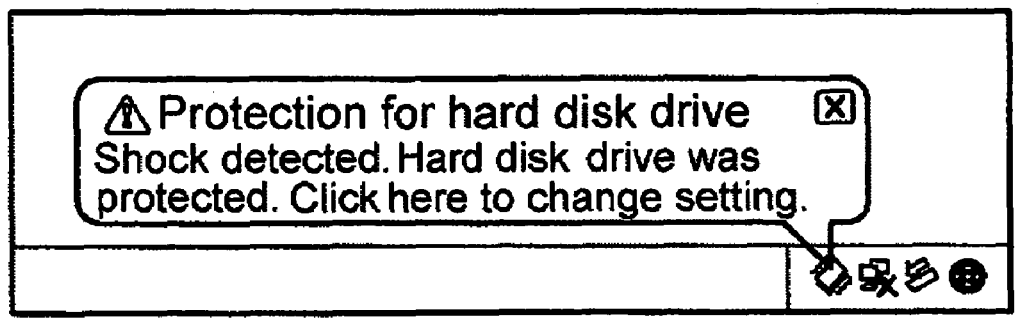
FIG. 4 is a schematic diagram showing a display message that appears upon retraction of a magnetic head of a hard disk drive (HDD)

In addition, the utility software 13 causes a message indicating that a protection function for the HDD 3 is operating to be displayed when the magnetic head is retracted as shown in FIG. 4. Utilizing the communicating mechanism that communicates with the EC 5, the utility software 13 provides a sensitivity switching mechanism and displays current shock levels and so forth.

When the utility software 13 issues the head retraction command to the HDD 3, a filter driver 14 detects the command. When the filter driver 14 has detected the command, the filter driver 14 blocks commands issued from a disk driver 15 or the like to the HDD 3 for a predetermined period (for example, around 2 to 3 seconds). In other words, since the commands are blocked, the HDD 3 is not accessed and the magnetic head is kept retracted. The period for which commands are blocked may be changed by the utility software 13 or the like depending on the levels of shock and vibration.

Next, a basic flow until the magnetic head of the HDD 3 is retracted based on the acceleration information in the note-type PC 100 will be described.

1. When the EC 5 (shock/vibration determination engine 11) has determined that there is a necessity to retract the magnetic head of the HDD 3, the EC 5 sends a "request for issuing the head retraction command to the HDD 31" to the utility software 13.

2. Corresponding to the request, the utility software 13 issues the magnetic head retraction command to the HDD 3.

3. When the HDD 3 receives the magnetic head retraction command, the HDD 3 retracts the magnetic head to the data-free landing zone.

4. The filter driver 14 detects that the utility software 13 has issued the magnetic head retraction command and blocks the HDD 3 from being accessed for a predetermined period (around 2 to 3 seconds).

Next, the shock/vibration determination process performed by the shock/vibration determination engine 11 will be described in detail.

[Filter Function]

The acceleration sensor 4 according to this embodiment is a sensor that can measure gravitational acceleration in a still state. Thus, information that is output from the acceleration sensor 4 is the sum of gravitational acceleration and acceleration due to shock and vibration. The acceleration information obtained from the acceleration sensor 4 is not directly used, but divided into high frequency components and low frequency components by a filter process. As a result, the acceleration information can be decomposed into characteristic motions. The high frequency components of the acceleration information mainly contain a motion due to shock or vibration. In contrast, the low frequency components of the acceleration information mainly contain a motion due to gravitational acceleration or slow operation.

The shock/vibration determination engine 11 assigns a threshold value to each of the high frequency components and the low frequency components. As a result, the shock/vibration determination engine 11 can make the following determinations.

(a) The high frequency components are mainly used to determine shock and vibration.

(b) The low frequency components are mainly used to determine change of gravitational components.

The determination of change of gravitational components includes determination of zero-gravity and determination of the start of carrying state of note type PC where the low frequency components largely vary.

Obtaining Low Frequency Components (Through Low Pass Filter)

A method of realizing the low pass filter is not specifically limited in this embodiment. The low pass filter based on an infinite-duration impulse response (IIR) type filter may be accomplished by software. Since the IIR type filter is well known as a digital filter, its description is omitted.

When acceleration input values obtained from the acceleration sensor 4 are denoted by G[n], a filter function Glpf[n] is given by the following formula $$Glpf[n]=Glpf[n-1]+\beta(Glpf[n-1]-G[n])$$

where β is a parameter that is used when the characteristics of the low pass filter are changed. In addition, β is a value given as a parameter of the program. In this example, β is assigned as ⅛. When β=8 is substituted into the foregoing formula, the following formula is obtained $$Glpf[n]=Glpf[n-1]+(1/8)(Glpf[n-1]G[n])$$

where Glpf[n−1] is a value obtained in the immediately preceding calculation. When the filter process is designed to be performed every 5 msec, the value of 5 msec before is obtained. However, when the low pass filter is accomplished by a program, it is necessary to substitute G[n] into Glpf[n−1] as an initial value in the first time.

The shock/vibration determination engine 11 performs this calculation for the X axis, Y axis, and Z axis. The obtained values Glpf[n] are stored.

Obtaining High Frequency Components (by High Pass Filter)

Likewise, a method of accomplishing the high pass filter is not specifically limited in this embodiment. For example, the high frequency components can be obtained by subtracting the low frequency components Glpf[n] obtained from the low pass filter, from the value obtained from the acceleration sensor 4.

In other words, the high frequency components are given by the following formula $$Ghpf[n]=|G[n]-Glpf[n]|$$

Alternatively, the high frequency components may be given by the following formula $$Ghpf[n]=|(1-\beta)(G[n]-G[n-1]-Ghpf[n-1])|$$

where β is a parameter used to change the characteristics of the high pass filter. The characteristics of the high pass filter can be changed to the characteristics of the low pass filter by the value of β.

The shock/vibration determination engine 11 performs this calculation for the X axis, Y axis, and Z axis and holds the obtained values Ghpf[n].

Filter Function by Hardware

Besides the filter function by software, it is preferred that a low pass filter of hardware be disposed between the EC 5 and the acceleration sensor 4 to cut high frequency components exceeding a predetermined frequency (100 Hz). This filter may be accomplished for example by a filer IC and a combination of parts of capacitors, resistors, and so forth. However, the method of accomplishing this filter is not limited in this embodiment. It is thought that in the normal use of a device, the frequency hardly becomes high to exceed 100 Hz, thus it is sufficient to designate the cut frequency of the low pass filter as around 100 Hz. In addition, to remove noise, it is preferred to use the low pass filter.

Moreover, due to the limitation of the processing capacity, the EC 5 (shock/vibration determination engine 11) may not detect high frequency components. If software is designed to poll values of the axes every 5 msec, sampling frequency will become 200 Hz. Thus, since the EC 5 may not detect a frequency higher than 200 Hz, it is necessary for hardware to filter high frequency components.

[Determination of Shock/Vibration]

When the value of Ghpf[n] obtained from the foregoing calculation exceeds a predetermined value, the shock/vibration determination engine 11 determines that strong shock have been applied and sends a "request for issuing the head retraction command to the HDD 3" to the utility software 13.

Determination with Respect to Change of Gravitational Components—No. 1 (Detection of Zero-Gravity)

When a device is dropped in free fall state without shock or vibration, the possibility of which shock is applied to the device as the device finally collides with the floor or the like. Thus, it is necessary to detect zero-gravity state to retract the magnetic head of the HDD 3 to the data-free landing zone. When the shock/vibration determination engine 11 has determined that zero-gravity state occurred, the shock/vibration determination engine 11 sends the "request for issuing the head retraction command to the HDD 3" to the utility software 13.

The shock/vibration determination engine 11 determines that zero-gravity state has occurred when the following two conditions are satisfied.

1. When the values that have been processed by the high pass filter for the X axis, Y axis, and Z axis are denoted by Gx_hpf [n], Gy_hpf [n], and Gz_hpf [n], respectively, the condition of $(Gx\_hpf[n])^2+(Gy\_hyp[n])^2+(Gz\_hpf[n])^2 \leq (0.6G)^2$ is satisfied. Since the value on the right side (0.6G) is a parameter that changes depending on the characteristics of the acceleration sensor and the device, the value may be changed.

2. When the values that have been processed by the low pass filter for the X axis, Y axis, and Z axis are denoted by Gx_lpf[n], Gy_lpf[n], and Gz_lpf[n], respectively, the condition of Gx−lpf[n]≦10, Gy_lpf[n]≦10, Gz_lpf[n]≦10 is satisfied.

Since the value on the right side (10) changes depending on the characteristics of the acceleration sensor and the device, the value may be changed.

Determination with Respect to Change of Gravitational Components—No. 2 (Detection of Carrying State)

At the moment the note-type PC is just carried by hand, acceleration may largely vary in the low frequency region. Additionally, when the note-type PC is suddenly lifted, the risk of which it is dropped or hit to something becomes high. Thus, when acceleration in the low frequency region exceeds a predetermined threshold value, the shock/vibration determination engine 11 determines that a carrying state occurred and sends a "request for issuing the head retraction command to the HDD 3" to the utility software 13.

The shock/vibration determination engine 11 determines that the carrying state occurred when the following condition is satisfied.

1. When the values that have been processed by the low pass filter for the X axis, Y axis, and Z axis are denoted by Gx_lpf[n], Gy_lpf[n], and Gz_lpf[n], respectively, the condition of $(Gx\_lpf[n])^2+(Gy\_lpf[n])^2+(Gz\_lpf[n])^2 \geqq (1.8\,G)^2$ is satisfied.

Since the value on the right side (1.8 G) changes depending on the characteristics of the acceleration sensor and the device, the value may be changed.

[Vibration Mode Function]

If vibration in a predetermined level, not hard vibration, is constantly applied, namely in the case that a note-type PC is used in a vehicle such as train, user-friendliness would not be decreased when it is determined whether or not shock/vibration is applied corresponding to the following method.

It is preferred that this function be optionally implemented and when necessary this function be enabled or disabled.

The vibration mode may be determined in the following manner. If a value that has been processed by the high pass filter exceeds a predetermined shock/vibration threshold value in a predetermined period (A msec) a predetermined number of times (B times), it is determined that the "vibration mode" occur. In contrast, if a value that has been processed by the high pass filter does not exceed the predetermined shock/vibration threshold value in the predetermined period the predetermined number of times in the "vibration mode", it is determined that the "normal" mode occur. Since A and B are parameters, their values are not designated in this example.

In the vibration mode, the shock/vibration determination is roughly performed. For example, the shock/vibration threshold value is increased so that the magnetic head retraction event does not easily occur. Instead, only when the value obtained by $(Gx\_hpf[n])^2+(Gy\_hpf[n])^2+(Gz\_hpf[n])^2$ becomes a very large value, the magnetic head retraction request may be issued.

[Changing Sensitivity When Key of Keyboard is Pressed]

Depending on the position of the acceleration sensor 4 disposed in the note type PC 100, the output of the acceleration sensor 4 may largely vary with shock that occurs when a key of the keyboard 9 is pressed. According to this embodiment, since the EC 5 that controls the keyboard 9 has the shock/vibration determination engine 11, the state of the keyboard 9 can be easily detected. Thus, when a key of the keyboard 9 is pressed, the threshold value can be changed so that user-friendliness is not decreased.

Instead of the EC 5, the main CPU of the PC may be provided with a function of changing the sensitivity in the state that a key of the keyboard 9 is pressed. In other words, application software that operates on the OS performs this function. As the most common method of which the OS or application software that operates on the OS detects the state that a key of the keyboard 9 is pressed, key numbers called scan codes are transmitted. However, if the target device (note-type PC) has a plurality of keyboards, for example the PC is provided with a built-in keyboard and an external keyboard, it is difficult for the OS or the application software that operates thereon to determine whether or not scan codes are received from the built-in keyboard or the external keyboard. Since a possibility of which shock or vibration that occurs when a key of the external keyboard is pressed affects the built-in HDD 3 is relatively small, or rather, it is not preferred that the sensitivity be changed corresponding to the shock or vibration that occurs when a key of the external keyboard is pressed.

From the foregoing point of view, when the EC 5 is provided with the function of changing the sensitivity in the state that a key of the keyboard 9 is pressed, the sensitivity can be changed in the state that a key of the built-in keyboard 9 is pressed.

In the method of determining whether or not a key is pressed with a scan code, when it is received, a key of the keyboard 9 may not be pressed. In other words, after the keyboard 9 side has detected the state that a key of the keyboard 9 is pressed (a physical signal changes) and issued a scan code until the OS or the application software that operates thereon receives the scan code, there is a time lag at least for the communication time. For a function whose result largely depends on response time, for example protection of the HDD 3, it is important to determine whether or not there is a necessity to retract the head as quick as possible. From these points of view, the EC 5 that can detect the state that a key is pressed with a physical signal is advantageous. In other words, when the EC 5 is provided with the function of changing the sensitivity in the state that a key of the keyboard 9 is pressed, the EC 5 can have an advantage in timing.

When it is necessary to change the sensitivity in the state that a key of the keyboard 9 is pressed regardless of whether or not the keyboard 9 is a built-in keyboard or an external keyboard, if the PC does not have a device that connects an external keyboard, the main CPU, namely the OS or application software that operates thereon may be provided with the function instead of the EC 5.

[Changing Sensitivity in the State That Lid is Closed or Closing Operation is Performed]

When the note-type PC is used, it may be carried by hand after the lid is closed. When the state that the lid is closed is detected, by changing the threshold value for high sensitivity, a risk of which the head of the HDD 3 contacts its disk surface due to shock or vibration can be reduced. As a result, a chance of which the note-type PC 100 breaks down can be reduced. In this case, if the state that the lid is opened is detected, the threshold value is restored to the normal value. At the moment the lid (door) is closed, if the threshold value is decreased and the sensitivity is lowered, the head can be prevented from being unnecessarily retracted to the data-free landing zone. As a result, user-friendliness can be prevented from being decreased. In this case, the threshold value may be decreased for a period (several seconds) until the lid is closed. Thereafter, the threshold value is restored to the normal value or the threshold value may be increased and the sensitivity may be raised.

Like the foregoing "function of changing sensitivity in the state that a key of keyboard is pressed", when the lid is closed or its closing operation is performed, the sensitivity change process can be performed by application software that operates on the OS. However, there is a time lag after the lid is closed (a physical signal changes) until the OS detects it (the EC 5 interrupts the OS so as to inform that the lid is closed). For a function whose result largely depends on response time, for example protection of the HDD 3, it is important to determine whether or not there is a necessity to retract the head as quickly as possible. As the EC 5 that can detect the state that the lid is closed with a physical signal that determines this state, the EC 5 can have an advantage in timing.

[Setting up Sensitivity by User]

A portable device such as a note-type PC can be used in various environments. It can be considered that the portable device is used in various environments, for example, in a house where the user uses the device on the user's desk or the like. When the user rides on a train or a car, the user uses the device on the user's lap. Levels of vibration and shock largely change depending on environments in which the user uses the device.

As described above, if the magnetic head is retracted while the magnetic head of the HDD 3 is accessing its magnetic disk, safety of the HDD 3 is assured. However, since accessing to the HDD 3 is temporarily denied, the user-friendliness will decrease. Thus, in this embodiment, the user is permitted to select safety or performance for the HDD 3 by setting up the sensitivity of shock and vibration.

The sensitivity of shock and vibration can be changed by changing the threshold value of the foregoing "determination of shock/vibration". This function can be accomplished only by software without necessity to convert and/or process electric signals that are output from the acceleration sensor 4.

Next, an operation of the note-type PC 100 having the foregoing functions will be described.

[Overall Operation]

Figure 5:
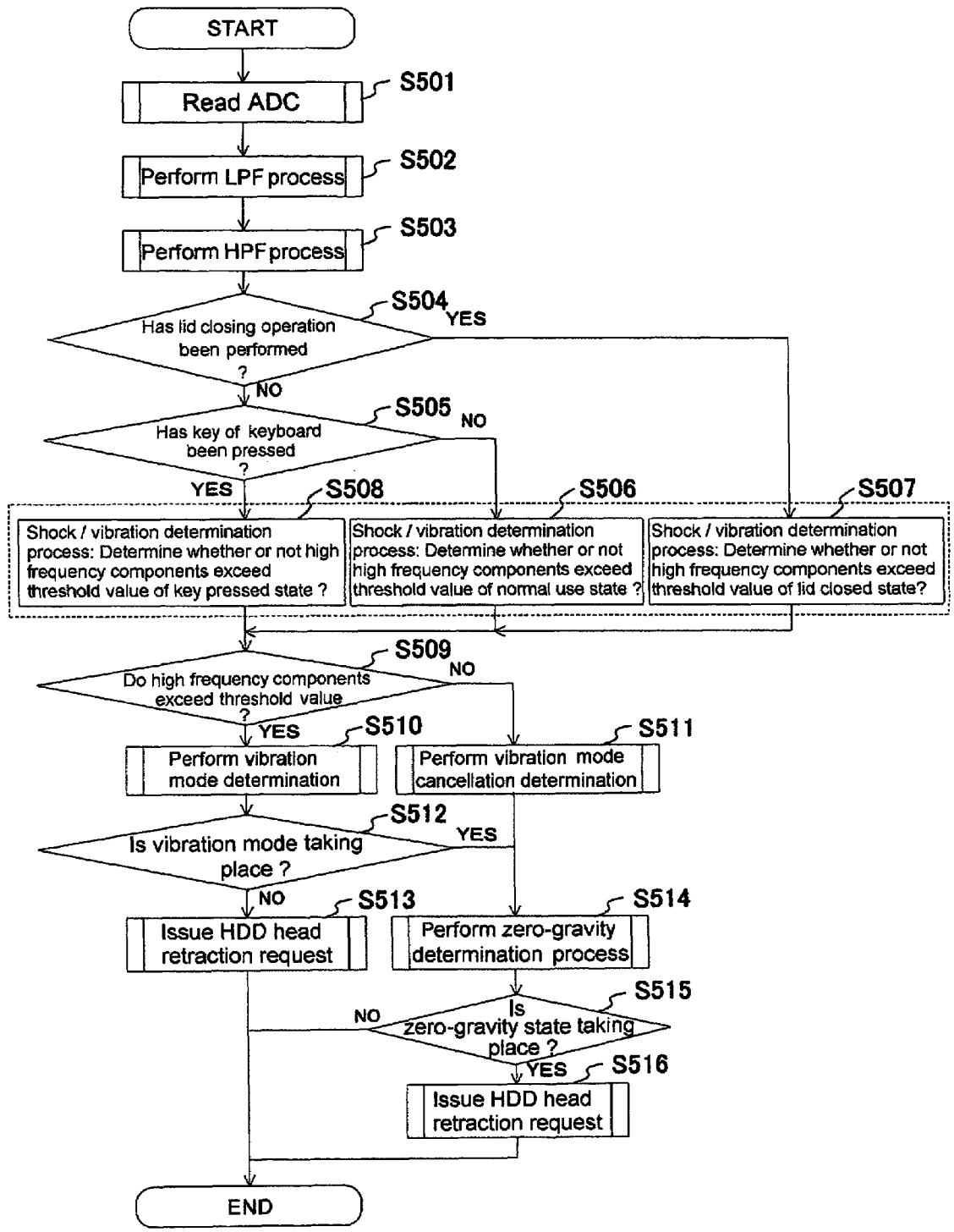
FIG. 5 is a flow chart showing an overall operation of a shock/vibration determination engine of the EC.

FIG. 5 is a flow chart showing an overall operation of the built-in shock/vibration determination engine 11 of the EC 5.

The EC 5 reads acceleration information (analog outputs) for the X axis, Y axis, and Z axis. The ADC (A/D converter) 12 converts the acceleration information as analog signals into digital signals (at step S501). The EC 5 obtains low frequency components from the low pass filter for the acceleration information for the X axis, Y axis, and Z axis (at step S502). The EC 5 subtracts the low frequency components that are output from the low pass filter from the acceleration information for the X axis, Y axis, and Z axis and obtains high frequency components (at step S503).

The EC 5 determines whether or not the lid is closed on based on an output of the lid open/close detection section 10 (at step S504). When the determined result indicates that the lid is not closed (No at step S504), the EC 5 determines whether or not a key of the keyboard 9 is pressed (at step S505). When the determined result indicates that a key of the keyboard 9 is not pressed (NO at step S505), the EC 5 performs a shock/vibration determination process to determine whether or not the acceleration values of the high frequency components exceed a threshold value of the normal use state (at step S506).

When the determined result at step S504 indicates that the lid is closed (YES at step S504), the EC 5 performs the shock/vibration determination process to determine whether or not the acceleration values of the high frequency components exceed a threshold value of the lid closed state (at step S507). When the determined result at step S505 indicates that a key of the keyboard 9 is pressed (YES at step S505), the EC 5 performs the shock/vibration determination process of determining whether or no the acceleration values of the high frequency components exceed a threshold value of the key pressed state (at step S508).

When the determined result in the shock/vibration determination process at step S506, step S507, or step S507 indicates that the acceleration values of the high frequency components exceed the threshold value (YES at step S509), the EC 5 performs a vibration mode determination process (at step S510). When the acceleration values exceed the shock/vibration threshold value in the predetermined period (A msec) more than the predetermined number of times (B times), the EC 5 determines that the "vibration mode" occurs. Otherwise, the EC 5 determines that the "normal mode" occurs. When the determined result indicates that the "normal mode" occurs (NO at step S512), the EC 5 sends a "request for issuing the head retraction command to the HDD 3", to the utility software 13 (at step S513).

On the other hand, when the determined result in the shock/vibration determination process indicates that the acceleration values of the high frequency components do not exceed the threshold value (No at step S509), the EC 5 performs a vibration mode cancellation determination process (at step S511). In other words, when the determined result in the vibration mode that the acceleration values of the high frequency component do not exceed the threshold value, the EC 5 cancels the "vibration mode" and changes it to the "normal mode". However, in the "normal mode", the EC 5 keeps the "normal mode".

When the acceleration values of the high frequency components do not exceed the threshold value in the shock/vibration determination process (NO at step S509) or the determined result at step S512 indicates that the "vibration mode" occurs (YES at step S512), the EC 5 performs a zero-gravity determination process, namely the determination processes 1 and 2 with respect to change of gravitational components (detection of zero-gravity state) and (detection of carrying state) (at step S514). When the determined result indicates that the zero-gravity state or carrying state occurred (YES at step S515), the EC 5 sends a "request for issuing the head retraction command to the HDD 3", to the utility software 13 (at step S516).

Instead, a gravitational component change determination process may be performed with only low frequency components of acceleration information obtained from the low pass filter, not with high frequency components obtained from the high pass filter.

Figure 6:
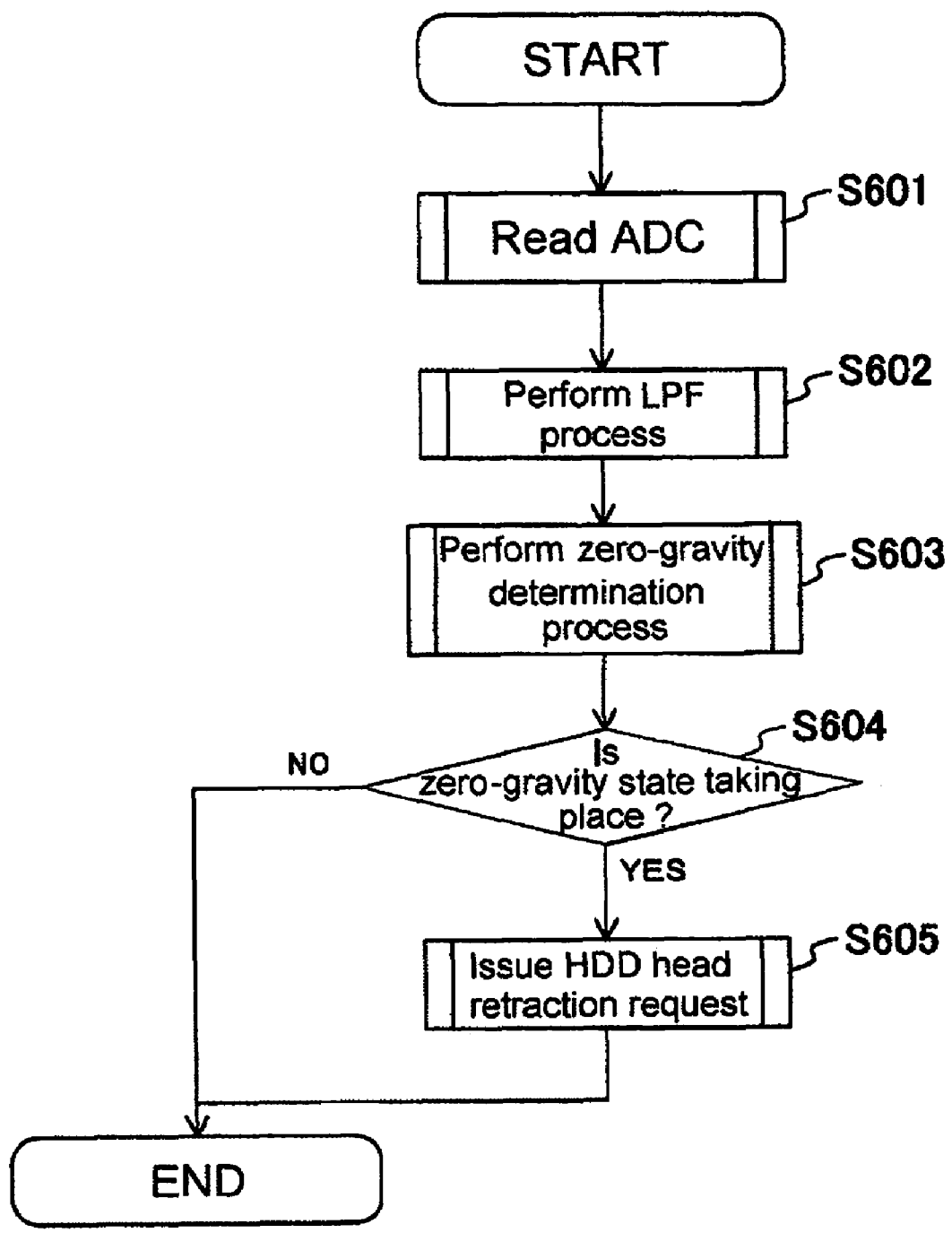
FIG. 6 is a flow chart showing an operation for a vibration/shock determination process only with low frequency components of acceleration information.

FIG. 6 is a flow chart showing an overall operation of the shock/vibration determination engine 11 of the EC 5.

The EC 5 reads acceleration information (analog outputs) for the X axis, Y axis, and Z axis from the acceleration sensor 4. The ADC 12 converts the analog signals into digital signals (at step S601). The EC 5 obtains low frequency components from the low pass filter for the acceleration information for the X axis, Y axis, and Z axis obtained from the acceleration sensor 4 (at step S602). Thereafter, the EC 5 performs the gravitational component change determination process for the low frequency components of acceleration information obtained from the low pass filter (at step S603). At this point, the gravitational component change determination process may be performed by determining that the gravitational state occur when conditions stated in paragraph 2 are satisfied in the gravitational component change determination process No. 1 (detection of zero gravity state). When the determined result indicates that the zero-gravity state occurs (YES at step S604), the EC 5 sends a "request for issuing the head retraction command to the HDD 3", to the utility software 13 (at step S605).

Next, a head retraction determination process with a change of sensitivity caused by pressing a key of a keyboard and a head retraction determination process with a change of sensitivity caused by closing a lid and performing a closing operation according to another embodiment of the present invention will be described.

Figure 7:
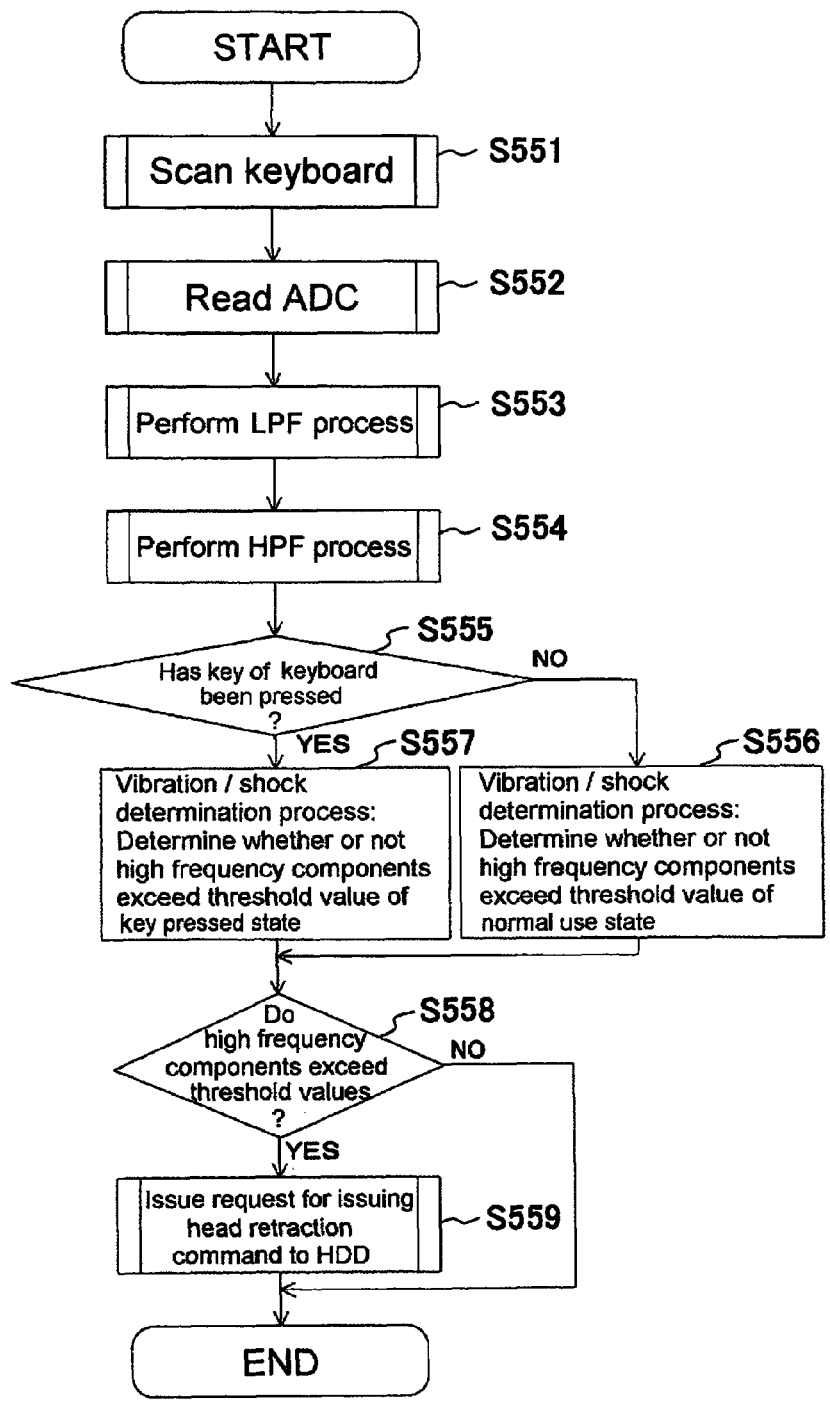
FIG. 7 is a flow chart showing a head retraction determination process with a change of sensitivity caused by pressing of a key of a keyboard.

FIG. 7 is a flow chart showing a head retraction determination process with a change of sensitivity caused by pressing of a key of a keyboard.

EC 5 scans a keyboard 9 and determines whether the pressing of keys is taking place (at step S551). Thereafter, the EC 5 reads acceleration information of X axis, Y axis, and Z axis (analog outputs) from an acceleration sensor 4. A/D converters (ADC) 12 converts the acceleration information as analog signals into digital signals (at step S552). The EC 5 extracts low frequency components from the acceleration information of X axis, Y axis, and Z axis obtained from the acceleration sensor 4 through a low pass filter (at step S553). The EC 5 subtracts the low frequency components extracted through the low pass filter from the acceleration information of X axis, Y axis, and Z axis obtained from the acceleration sensor 4 and thereby obtains high frequency components (at step S554).

At this point, the EC 5 checks whether or not a key of the keyboard 9 has been pressed from the obtained information at the time of scanning of the keyboard 9 (at step S555). When a key has not been pressed (No at step S555), the EC 5 performs a vibration/shock determination process of determining whether or not acceleration values of the high frequency components exceed a threshold value of a normal use state (at step S556). When the determined result at step S555 indicates that a key of the keyboard 9 has been pressed (YES at step S555), the EC 5 performs a vibration/shock determination process of determining whether or not the acceleration values of the high frequency components exceed a threshold value of a key pressed state (at step S557).

When the determined results of the vibration/shock determination processes at step S556 and step S557 indicate that the acceleration values of the high frequency components exceed these threshold values (YES at step S558), the EC 5 sends a "request for issuing the head retraction command to the HDD 3" to utility software 13 (step s559). On the other hand, when the determined results indicate that the acceleration values of the high frequency components do not exceed these threshold values (NO at step S558), the EC 5 simply completes the head retraction determination process.

Figure 8:
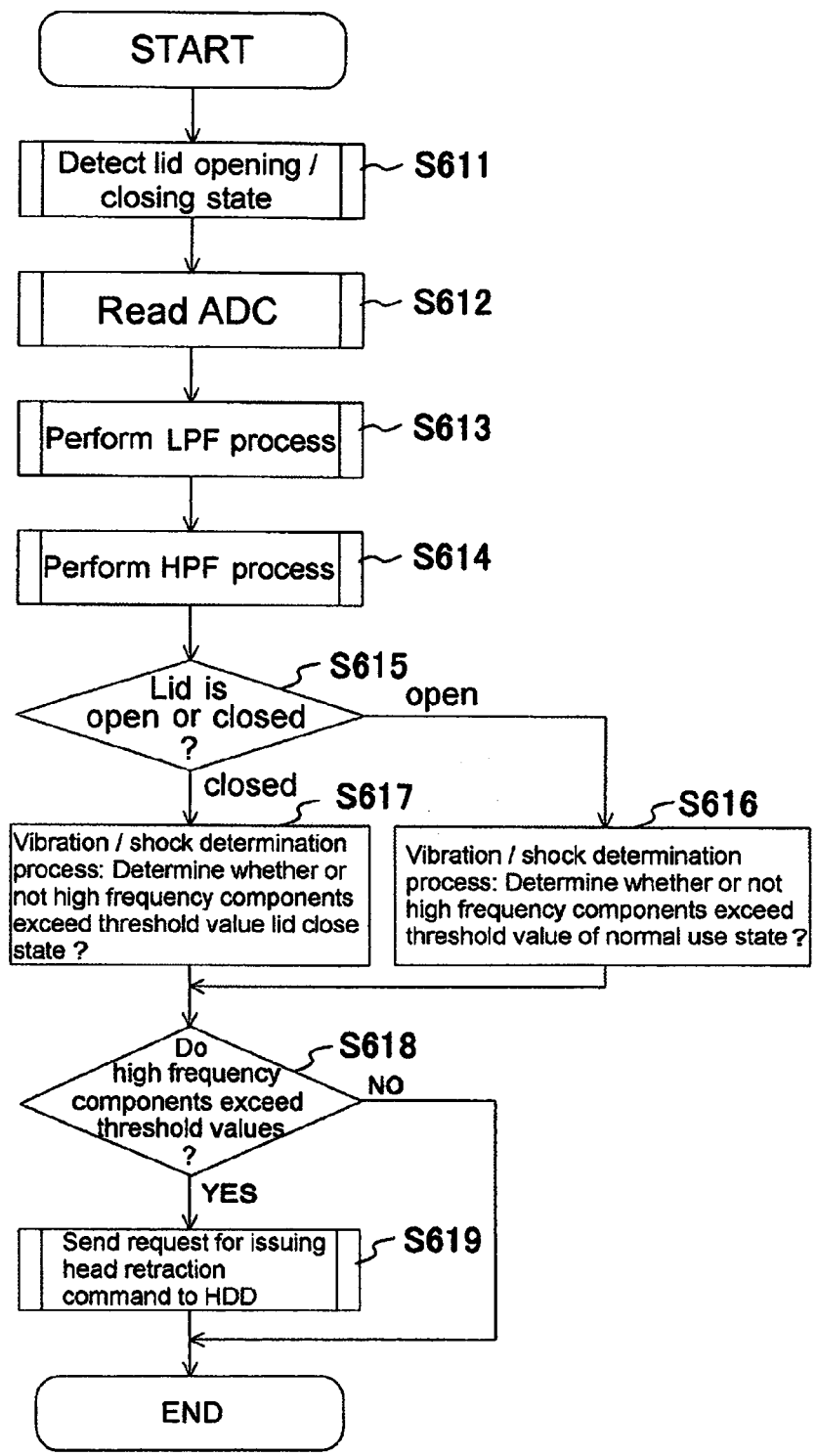
FIG. 8 is a flow chart showing a head retraction determination process with a change of sensitivity caused by closing a lid.

FIG. 8 is a flow chart showing a head retraction determination process with a change of sensitivity involved at a time when the lid is at its closing state or in act of closing operation.

The EC 5 determines whether or not a lid closing operation has taken place based on an output of the lid open/close detection section 10 (at step S611). Thereafter, the EC 5 reads acceleration information of X axis, Y axis, and Z axis (analog outputs) from the acceleration sensor 4. The ADC 12 converts the acceleration information as analog signals into digital signals (at step S612). The EC 5 extracts low frequency components from the acceleration information of X axis, Y axis, and Z axis obtained from the acceleration sensor 4 through a low pass filter (at step S613). The EC 5 subtracts the low frequency components obtained through the low pass filter from the acceleration information of X axis, Y axis, and Z axis obtained from the acceleration sensor 4 and thereby obtains high frequency components (at step S614).

The EC 5 determines whether or not the lid closing operation has taken place (at step S615). When the determined result indicates that the lid closing operation has not taken place (No at step S615), the EC 5 performs a vibration/shock determination process of determining whether or not the acceleration values of the high frequency components exceed a threshold value of a normal use state (at step S616). When the determined result at step S615 indicates that the lid closing operation has taken place (YES at step S615), the EC 5 performs a vibration/shock determination process of determining whether or not the acceleration values of the high frequency components exceed a threshold value of a lid closed state (at step S617).

When the determined results of the vibration/shock determination processes at step S616 and step S617 indicate that the acceleration values of the high frequency components exceed these threshold values (YES at step S618), the EC 5 sends a "request for issuing the magnetic head retraction command to the HDD 3" to the utility software 13 (at step S619). When the determined results indicate that the acceleration values of the high frequency components do not exceed the threshold values (NO at step S618), the EC 5 simply completes the head retraction determination process.

Next, the shock/vibration sensitivity change process will be described in detail.

To increase the response sensitivity, the threshold value against values that have been processed by the high pass filter is decreased. In contrast, to decrease the response sensitivity, the threshold value is increased. In the note-type PC 100 according to this embodiment, man-machine interface (MMI) of allowing the user to change the threshold value, is accomplished by the utility software 13.

Figure 9:
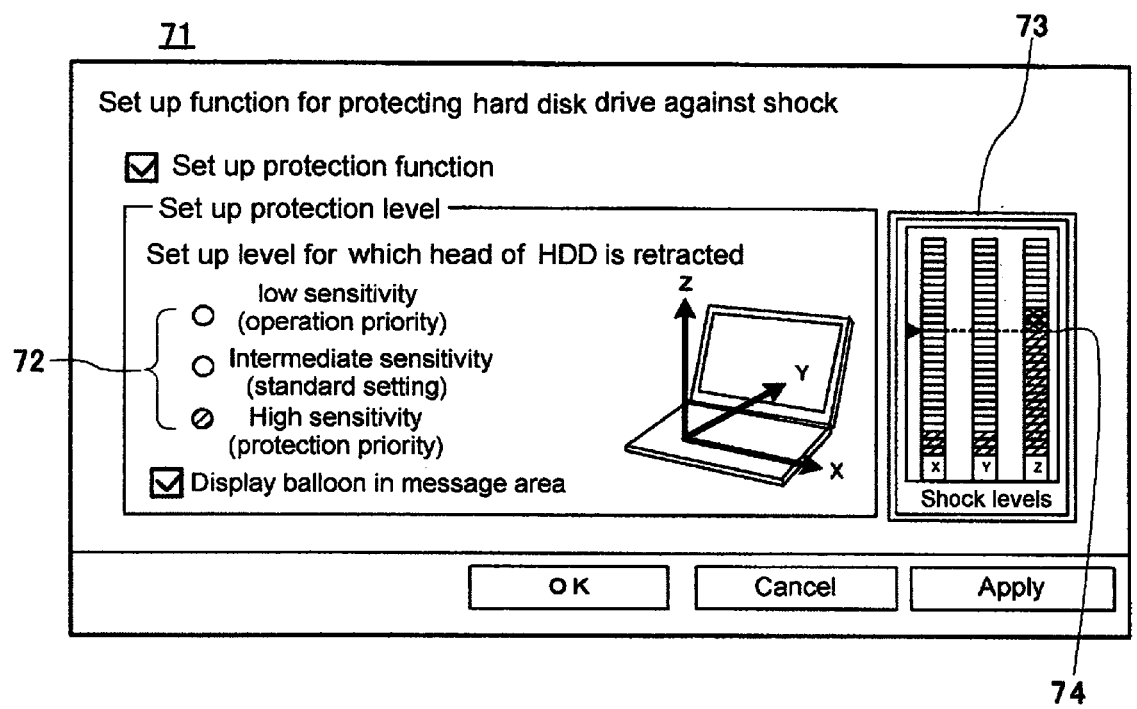
FIG. 9 is a schematic diagram showing a man-machine interface (MMI) display screen for sensitivity setting and shock level.

FIG. 9 shows an example of a display screen 71 of the MMI. On the display screen 71, the threshold value (sensitivity level) is set as "setting a protection level". There are three protection levels "low sensitivity (operation priority)", "intermediate sensitivity (standard setting)", and "high sensitivity (protection priority)". A protection level is set up by clicking a radio button 72 corresponding to a desired level with a mouse or the like. The utility software 13 stores information that the user has set up on the MMI display screen 71 in a storage section such as the HDD 3.

The utility software 13 sends a threshold change request to the shock/vibration determination engine 11 corresponding to setup information that has been stored. When the shock/vibration determination engine 11 receives the threshold value change request from the utility software 13, the shock/vibration determination engine 11 changes the threshold value.

The MMI display screen 71 also has a shock level display area 73 that displays shock levels for the three axes with level meters in real time. The shock level display area 73 also displays positions of setup threshold values with lines 74 highlighted with colors so that the user can visually compare the detected shock levels with the setup threshold value. Thus, the user can easily set up optimum sensitivity for example by moving the note-type PC 100.

When the utility software 13 issues the magnetic head retraction command, it is preferred that the utility software 13 display a message like "Head retraction process has been performed." on the display section so as to inform the user that the event has been generated.

Figure 10:
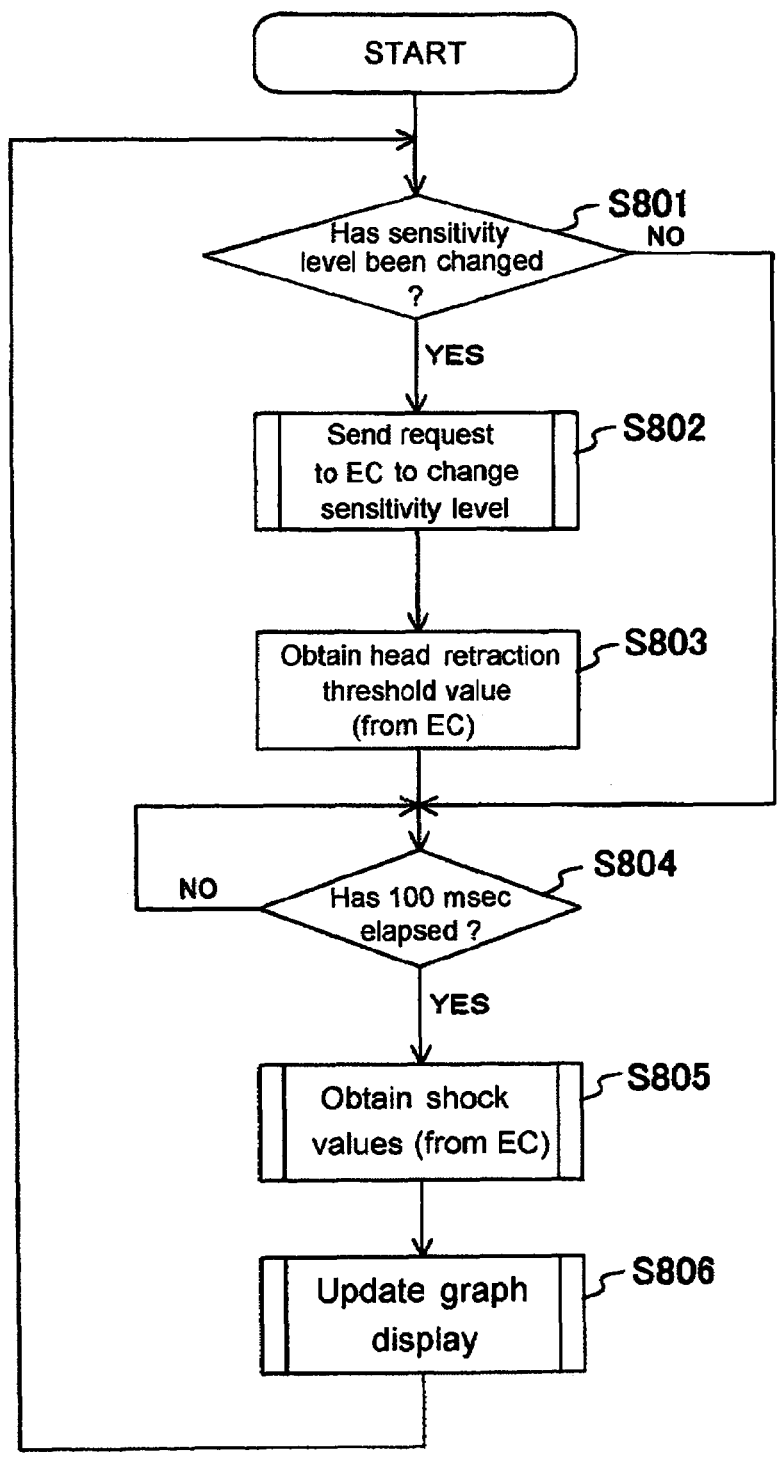
FIG. 10 is a flow chart showing a sensitivity management and a shock level display process performed by utility software.

FIG. 10 is a flow chart showing a process with respect to sensitivity management and shock level display by the utility software 13.

Figure 11:
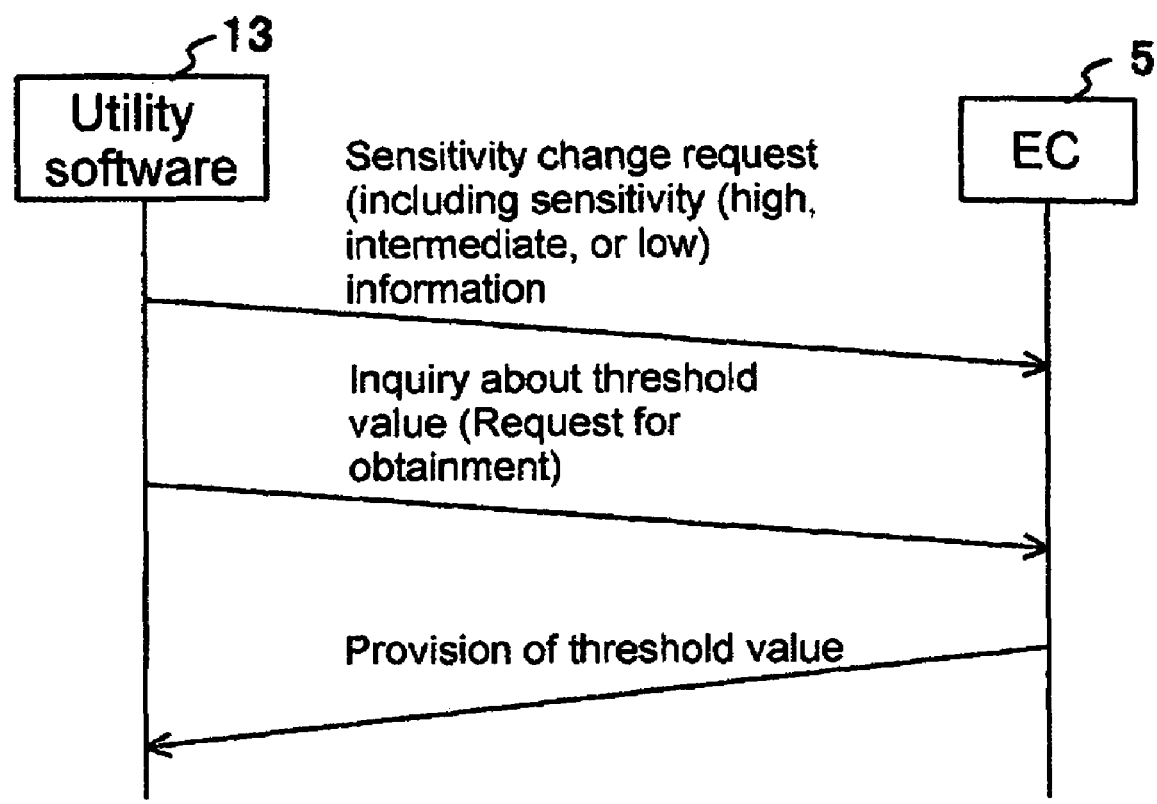
FIG. 11 is a schematic diagram showing a communication sequence between the utility software and the EC.

The utility software 13 checks whether or not a sensitivity level has been changed by a user's operation (at step S801). When a sensitivity level has been changed by a user's operation, the utility software 13 informs the EC 5 of a sensitivity change request including information about new sensitivity level (low sensitivity, intermediate sensitivity, or high sensitivity) (at step S802). Thereafter, the utility software 13 inquires the EC 5 of a threshold value corresponding to the sensitivity level, obtains the threshold value corresponding to the current sensitivity level from the EC 5, and displays their threshold value lines 74 in the shock level display area 73 (at step S803). FIG. 11 shows a communication sequence between the utility software 13 and the EC 5.

Figure 12:
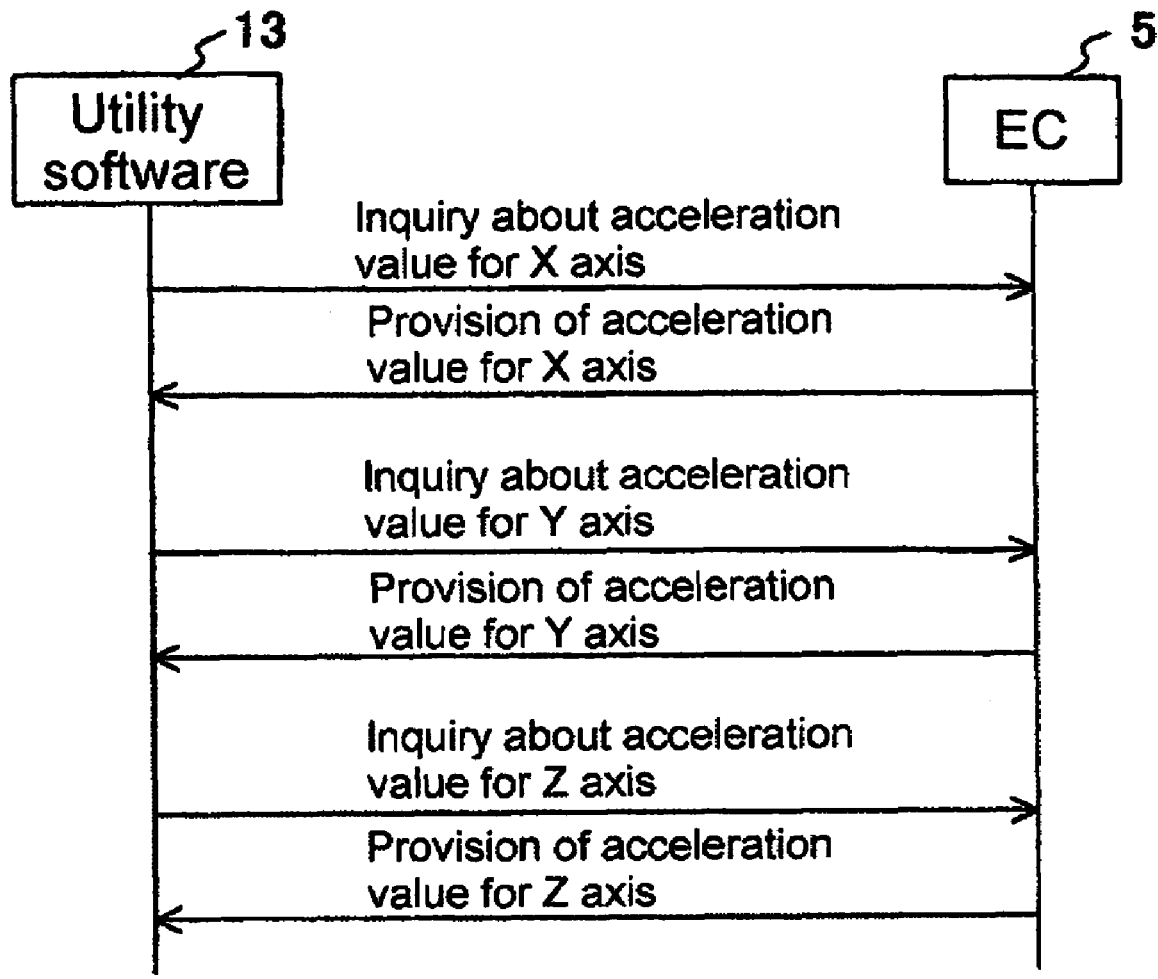
FIG. 12 is a schematic diagram showing another communication sequence between the utility software and the EC.

The utility software 13 obtains data of acceleration values for the X axis, Y axis, and Z axis from the EC 5 (at step S805) for a predetermined period (for example, 100 msec) (at step S804) and updates shock levels in the shock level display area 73 (at step S806). The EC 5 receives an inquiry about acceleration values for the X axis, Y axis, and Z axis at predetermined intervals and sends the maximum values of acceleration values for the X axis, Y axis, and Z axis detected in a past predetermined period to the utility software 13. A communication sequence performed between the utility software 13 and the EC 5 is shown in FIG. 12.

It should be understood by those skilled in the art that various modifications, combinations, sub-combinations and alternations may occur depending on design requirements and other factors insofar as they are within the scope of the appended claims or the equivalents thereof.

The invention claimed is:

1. An information processing apparatus, comprising:
   a hard disk drive configured to move a head to a data-free landing zone;
   an acceleration sensor configured to detect acceleration; and
   a determination section configured to obtain a low frequency component from the detected acceleration, to obtain a high frequency component from the detected acceleration, to obtain a vibration level based on the high frequency component, to compare the vibration level with a preset threshold value, and to detect a vibration mode if the vibration level exceeds the preset threshold value a predetermined number of times in a predetermined period and detect a normal mode if the vibration level does not exceed the preset threshold value the predetermined number of times in the predetermined period, to move the head of the hard disk drive to the data-free landing zone if the normal mode is detected, and to determine whether it is necessary to move the head of the hard disk drive to the data-free landing zone based on the low frequency component if the vibration mode is detected.

2. The information processing apparatus as set forth in claim 1, wherein the determination section is configured to detect a change of a gravity component based on the low frequency component and to determine whether it is necessary to move the head of the hard disk drive to the data-free landing zone based on the change of the gravity component.

3. The information processing apparatus as set forth in claim 2, wherein the determination section is configured to determine whether a non-gravity state is taking place based on the change of the gravity component.

4. The information processing apparatus as set forth in claim 1, wherein the acceleration sensor is configured to detect acceleration in directions of three axes, and the determination section is configured to obtain low frequency components from the detected acceleration in the directions of the three axes and to determine whether it is necessary to move the head of the hard disk drive to the data-free landing zone based on the low frequency components.

5. The information processing apparatus as set forth in claim 1, wherein the determination section is configured to determine whether it is necessary to move the head of the hard disk drive to the data-free landing zone based on the low frequency component and the high frequency component.

6. The information processing apparatus as set forth in claim 5, wherein the determination section is configured to detect a change of a gravity component based on the low frequency component and the high frequency component and to determine whether it is necessary to move the head of the hard disk drive to the data-free landing zone based on the change of the gravity component.

7. The information processing apparatus as set forth in claim 6, wherein the determination section is configured to determine whether a non-gravity state is taking place based on the change of the gravity component.

8. The information processing apparatus as set forth in claim 5, wherein the determination section is configured to obtain the low frequency component through a low pass filter and to obtain the high frequency component as a value in which the low frequency component is subtracted from the detected acceleration.

9. The information processing apparatus as set forth in claim 5, wherein the acceleration sensor is configured to detect acceleration in directions of three axes, and the determination section is configured to obtain low frequency components and high frequency components from the detected acceleration in the directions of the three axes and to determine whether it is necessary to move the head of the hard disk drive to the data-free landing zone based on the low frequency components and the high frequency components.

10. The information processing apparatus as set forth in claim 1, further comprising an embedded controller, the determination section being in the embedded controller.

11. A head retraction processing method of a hard disk drive in an information processing apparatus having an acceleration sensor, the method comprising:
    detecting acceleration with the acceleration sensor;
    obtaining a low frequency component from the detected acceleration;
    obtaining a high frequency component from the detected acceleration;
    obtaining a vibration level based on the high frequency component;
    comparing the vibration level with a preset threshold value;
    detecting a vibration mode if the vibration level exceeds the preset threshold value a predetermined number of times in a predetermined period and detecting a normal mode if the vibration level does not exceed the preset threshold value the predetermined number of times in the predetermined period;
    moving the head of the hard disk drive to the data-free landing zone if the normal mode is detected; and
    determining whether it is necessary to move a head of the hard disk drive to a data-free landing zone based on the low frequency component if the vibration mode is detected.

12. The head retraction processing method as set forth in claim 11, wherein the determining step includes detecting a change of a gravity component based on the low frequency component and determining whether it is necessary to move the head of the hard disk drive to the data-free landing zone based on the change of the gravity component.

13. The head retraction processing method as set forth in claim 12, wherein the determining step includes determining whether a non-gravity state is taking place based on the change of the gravity component.

14. The head retraction processing method as set forth in claim 11, wherein the detecting step includes detecting acceleration in directions of three axes with the acceleration sensor, and the determining step includes obtaining low frequency components from the detected acceleration in the directions of the three axes and determining whether it is necessary to move the head of the hard disk drive to the data-free landing zone based on the low frequency components.

15. The head retraction processing method as set forth in claim 11, wherein the determining step includes determining whether it is necessary to move the head of the hard disk drive to the data-free landing zone based on the low frequency component and the high frequency component.

16. The head retraction processing method as set forth in claim 15, wherein the determining step includes detecting a change of a gravity component based on the low frequency component and the high frequency component and determining whether it is necessary to move the head of the hard disk drive to the data-free landing zone based on the change in the gravity component.

17. The head retraction processing method as set forth in claim 16, wherein the determining step includes determining whether a non-gravity state is taking place based on the change of the gravity component.

18. The head retraction processing method as set forth in claim 15, wherein the obtaining step includes obtaining the low frequency component through a low pass filter and obtaining the high frequency component as a value in which the low frequency component is subtracted from the detected acceleration.

19. The head retraction processing method as set forth in claim 15, wherein the detecting step includes detecting acceleration in directions of three axes with the acceleration sensor, and the determining step includes obtaining low frequency components and high frequency components from the detected acceleration in the directions of the three axes and determining whether it is necessary to move the head of the hard disk drive to the data-free landing zone based on the low frequency components and the high frequency components.

20. An information processing apparatus, comprising:
a hard disk drive configured to moving a head to a data-free landing zone;
an acceleration sensor configured to detect acceleration;
a determination section configured to obtain a low frequency component from the detected acceleration, to obtain a high frequency component from the detected acceleration, to obtain a vibration level based on the high frequency component, to compare the vibration level with a preset threshold value, and to detect a vibration mode if the vibration level exceeds the preset threshold value a predetermined number of times in a predetermined period and detect a normal mode if the vibration level does not exceed the preset threshold value the predetermined number of times in the predetermined period, to move the head of the hard disk drive to the data-free landing zone if the normal mode is detected, and to determine whether it is necessary to move the head of the hard disk drive to the data-free landing zone based on the low frequency component if the vibration mode is detected;
a keyboard configured to input information from a user; and
a threshold changing section configured to change the threshold value when an input of the keyboard is detected.

21. The information processing apparatus as set forth in claim 20, wherein the acceleration sensor is configured to detect acceleration in directions of three axes, and the determination section is configured to obtain high frequency components from the detected acceleration in the directions of the three axes, and to obtain a vibration level based on the high frequency components.

22. The information processing apparatus as set forth in claim 20, further comprising an embedded controller, the determination section being in the embedded controller.

23. An information processing apparatus, comprising:
a hard disk drive configured to moving a head to a data-free landing zone;
an acceleration sensor configured to detect acceleration;
a determination section configured to obtain a low frequency component from the detected acceleration, to obtain a high frequency component from the detected acceleration, to obtain a vibration level based on the high frequency component, to compare the vibration level with a preset threshold value, and to detect a vibration mode if the vibration level exceeds the preset threshold value a predetermined number of times in a predetermined period and detect a normal mode if the vibration level does not exceed the preset threshold value the predetermined number of times in the predetermined period, to move the head of the hard disk drive to the data-free landing zone if the normal mode is detected, and to determine whether it is necessary to move the head of the hard disk drive to the data-free landing zone based on the low frequency component if the vibration mode is detected;
a lid configured to be freely opened and closed relative to a main body of the information processing apparatus;
a lid open/close detection section configured to detect an open/close state of the lid; and
a threshold value changing section configured to change the threshold value when the lid open/close detection section has detected a close operation of the lid.

24. The information processing apparatus as set forth in claim 23, wherein the acceleration sensor is configured to detect acceleration in directions of three axes, and the determination section is configured to obtain high frequency components from the detected acceleration in the directions of the three axes, and to obtain a vibration level based on the high frequency components.

25. The information processing apparatus as set forth in claim 23, further comprising an embedded controller, the determination section being in the embedded controller.

26. A head retraction processing method of a hard disk drive in an information processing apparatus having an acceleration sensor, the method comprising:
detecting acceleration with the acceleration sensor;
obtaining a low frequency component from the detected acceleration;
obtaining a high frequency component from the detected acceleration;
obtaining a vibration level based on the high frequency component;
comparing the vibration level with a preset threshold value;
detecting a vibration mode if the vibration level exceeds the preset threshold value a predetermined number of times in a predetermined period and detecting a normal mode if the vibration level does not exceed the preset threshold value the predetermined number of times in the predetermined period;
moving the head of the hard disk drive to the data-free landing zone if the normal mode is detected;
determining whether it is necessary to move a head of the hard disk drive to a data-free landing zone based on the low frequency component if the vibration mode is detected;
detecting whether an input has been made from a user; and
changing the threshold value when the input from the user has been detected.

27. The head retraction processing method as set forth in claim 26, wherein the detecting step includes detecting acceleration in directions of three axes with the acceleration sensor, and the determining step includes obtaining high frequency components from the detected acceleration in the directions of the three axes, and obtaining a vibration level based on the high frequency components.

28. A head retraction processing method of a hard disk drive in an information processing apparatus having an acceleration sensor, the method comprising:

detecting acceleration with the acceleration sensor;

obtaining a low frequency component from the detected acceleration;

obtaining a high frequency component from the detected acceleration;

obtaining a vibration level based on the high frequency component;

comparing the vibration level with a preset threshold value;

detecting a vibration mode if the vibration level exceeds the preset threshold value a predetermined number of times in a predetermined period and detecting a normal mode if the vibration level does not exceed the preset threshold value the predetermined number of times in the predetermined period;

moving the head of the hard disk drive to the data-free landing zone if the normal mode is detected;

determining whether it is necessary to move a head of the hard disk drive to a data-free landing zone based on the low frequency component if the vibration mode is detected;

detecting whether a lid closing operation has been performed; and changing the threshold value when the lid closing operation has been performed.

29. The head retraction processing method as set forth in claim 28, wherein the detecting step includes detecting acceleration in directions of three axes with the acceleration sensor, and the determining step includes obtaining high frequency components from the detected acceleration in the directions of the three axes, and obtaining a vibration level based on the high frequency components.

* * * * *